Jan. 21, 1930.　　　　E. H. LORENZ　　　　1,744,128
WARE TRANSFERRING APPARATUS
Filed Sept. 3, 1920.　　5 Sheets-Sheet 1

Fig. 1.

INVENTOR
Edward H. Lorenz
By
ATTORNEY

Fig. 2.

INVENTOR
Edward H. Lorenz
By
ATTORNEY

Fig. 3.

Patented Jan. 21, 1930

1,744,128

UNITED STATES PATENT OFFICE

EDWARD H. LORENZ, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

WARE-TRANSFERRING APPARATUS

Application filed September 3, 1920. Serial No. 407,861.

This invention relates to transferring apparatus for removing the product of a glass shaping machine, and more particularly to apparatus for removing such product to another machine by which further operations are to be performed or to a conveyor. The invention is herein illustrated by a machine designed particularly for removing and transferring glassware from a shaping machine in which it is formed, as by pressing or blowing, to a conveyor, by which it is transported to an annealing lehr, this function being commonly termed "taking out".

The principal object of the invention is to provide a transferring apparatus of the character described, which will "take out" or transfer glassware in synchronism with a rapid machine without damage to the ware, and which will be capable of various adjustments and substitutions to operate upon ware of different size and shape, and to receive the ware from and to deliver it to accurately determined positions.

The various features of the invention employed in the accomplishment of this object will best be understood from the following description, taken in connection with the accompanying drawings of one embodiment of the invention, in which:—

Figure 1:
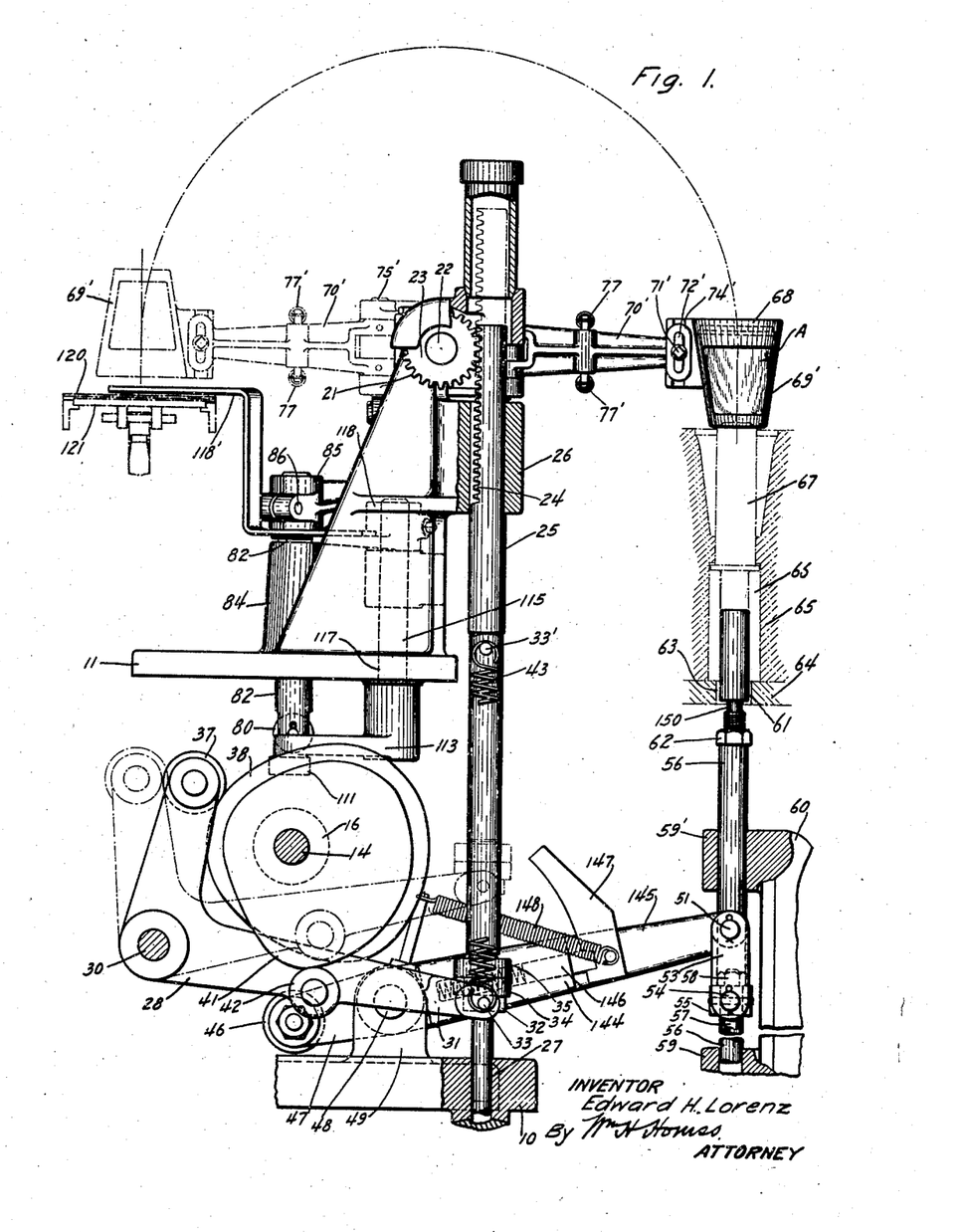
Fig. 1 is a front elevation in section on the line 1—1 of Fig. 3, showing portions of my transfer apparatus in relation to a molding machine and a conveyor from and to which the ware is to be transferred, some of the parts being broken away.

The principal function of the machine is best illustrated in Fig. 1 in which the ware holders 68, shown at the right in full lines, are receiving the ware A from a forming mold. From this position the ware holders are swung over to the left through the semi-circular path indicated by the dot and dash line, and deposit the ware in an inverted position on a carrier or receiving plate or other desired member, the ware holders being opened and closed at one or both of these stations as may be desired.

The supporting frame of the machine comprises a base 10 on which is supported a bracket 11 by means of interposed brackets 12 and 13, the latter serving also to provide bearings for a cam shaft 14 to which power is transmitted in a manner to be described and which is also provided with a hand wheel 15 keyed thereto. The transferring devices comprises a pair of transferring arms 70 and 70' (Fig. 3) carried by a rock shaft 22, journaled in bearings 21 and having a gear 23 which meshes with rack 24 on a vertically reciprocating rod 25, guided by bearings 26 and 27 in the frame.

The up and down motion of rod 25 to swing the ware holders from receiving to delivering position is produced by a bell crank lever 28 pivoted on stud 30, journaled in bracket 13, the long end of lever 28 terminating in a fork 31 carrying pivot blocks 32 whose pivot pins 33 turn in the fork. The pivot blocks bear against the lower side of a pair of spanner nuts 34 and 35 which determine the height to which rod 25 is raised by lever 28. The latter carries rollers 37 and 42 which are actuated by turnover cams 38 and 41, which move the ware holders 68 positively away from the full line portion, Fig. 1. In order that the mechanism may not be broken in case the ware holders 68 encounter any obstacle as they approach their receiving position, a yielding connection is provided between the rod 25 and the bell crank 28, which as illustrated consists of a pair of springs 43 connecting a pin 33' on the rod and the pivot pins 33 of the pivot blocks 32 in the bell crank. If the movement of the ware holders 68 toward the right (Fig. 1) is obstructed, the bell crank will continue its downward movement under the action of cam 41 while the rod remains stationary, thus distending the springs.

Although the cams 38 and 41 shown herein are so shaped as to positively move the bell crank 28 in both directions throughout its whole path of travel, coupled with a yielding action through the springs 43 in moving the ware holders 68 from delivering to receiving position, each cam may be relieved on one side so as to impart a positive swinging motion to the ware holders only up to a point beyond the vertical center of their swing, from which the ware holders would fall by their own gravity. This construction would permit the ware holders to yield on encountering broken glass or other obstructions as they approach the end of their stroke in each direction, and thus avoid serious damage. This would render unnecessary the use of the springs 43.

Figure 4:
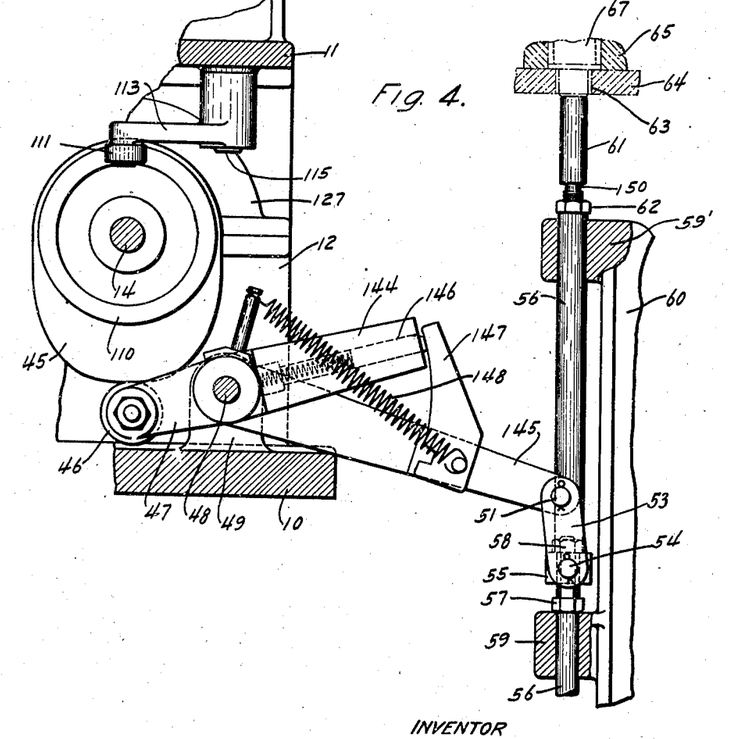
Fig. 4 is a vertical section on the line 4—4 of Fig. 2; showing particularly the yielding ejecting mechanism for removing the ware from the molds.
Figure 5:
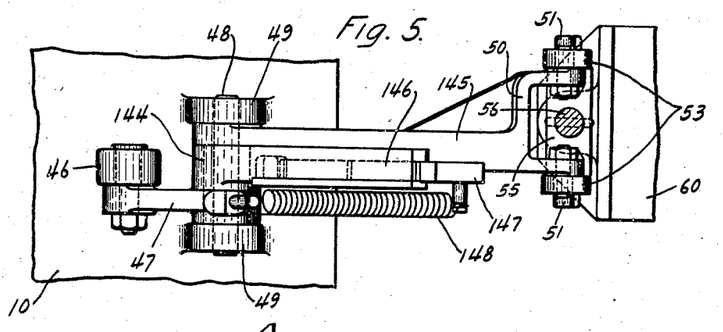
Fig. 5 is a plan view of the parts shown in Fig. 4.
Figure 6:
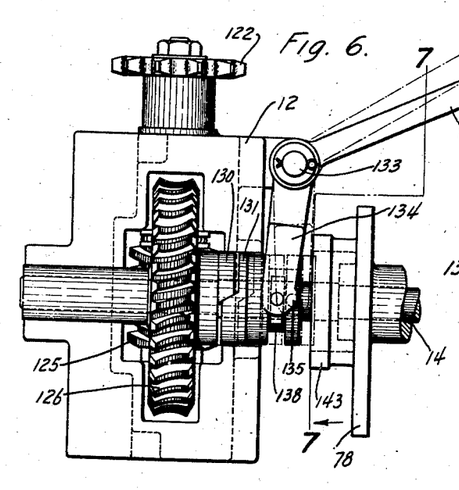
Fig. 6 is a plan view of the driving mechanism, the cover being removed.
Figure 7:
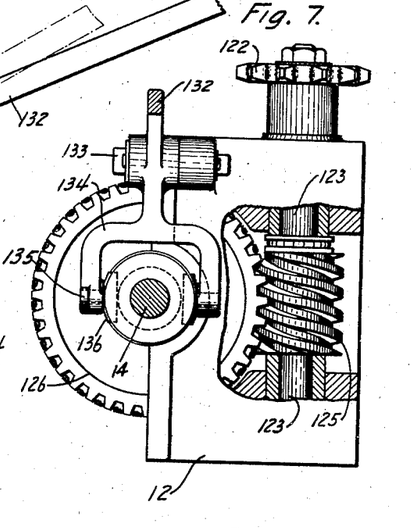
Fig. 7 is a section on the line 7—7 of Fig. 6.
Figure 8:
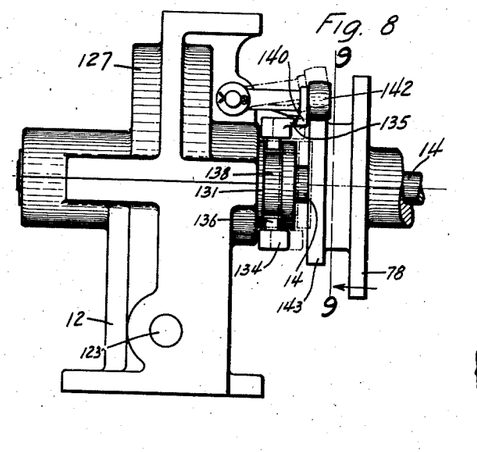
Fig. 8 is a side elevation of the parts shown in Fig. 6 with the cover in position.
Figure 9:
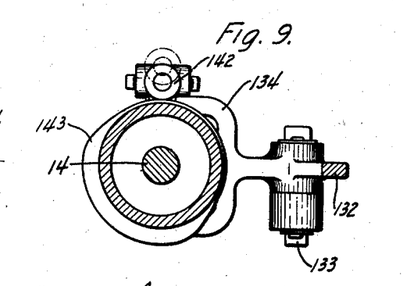
Fig. 9 is a vertical section on the line 9—9 of Fig. 8.

The ejecting mechanism for delivering an article A to the ware holders 68 comprises a push up cam 45 (Fig. 4) mounted on shaft 14, bearing against a roller 46 on one end of a composite lever 47 which is fulcrumed on a stud 48, working in bearings 49 on base 10. The opposite end of lever 47 terminates in a fork 50 carrying studs 51 on which are pivoted links 53 whose opposite ends are pivoted on pins 54 of a cross head 55. The latter is secured on a reduced portion of push rod 56 and has two internally threaded openings which carry bolts 57 secured in any desired position by lock nuts 58, and limiting the downward movement of push rod 56 by contacting with the lower of two bearings 59 and 59' in a bracket 60 on the associated forming machine.

The upper end of rod 56 is internally threaded to receive a threaded end of a push rod extension 61, thus permitting adjustment of the length of the push rod, and hence the height to which the ware is raised, a lock nut 62 securing the extension in any adjusted position. The upper end of push rod extension 61 enters openings 63 in the bottom of mold table 64, which carries any convenient number of molds 65, although for the sake of clearness only one has been shown. These molds are successively positioned at the transfer station by the movement of the table. Each mold 65 has an opening 66, in which is carried a bottom piece 67, known as a "valve." This valve is aligned with an opening 63 in mold table 64, and the associated forming machine and the transfer apparatus are so timed that an opening 63 is over push rod 56 each time the table is stopped for a transfer operation. There, by the action of cam 45 the valve 67 and the molded article A are raised to the desired height at which the latter may be received by the ware holders 68.

Figure 2:
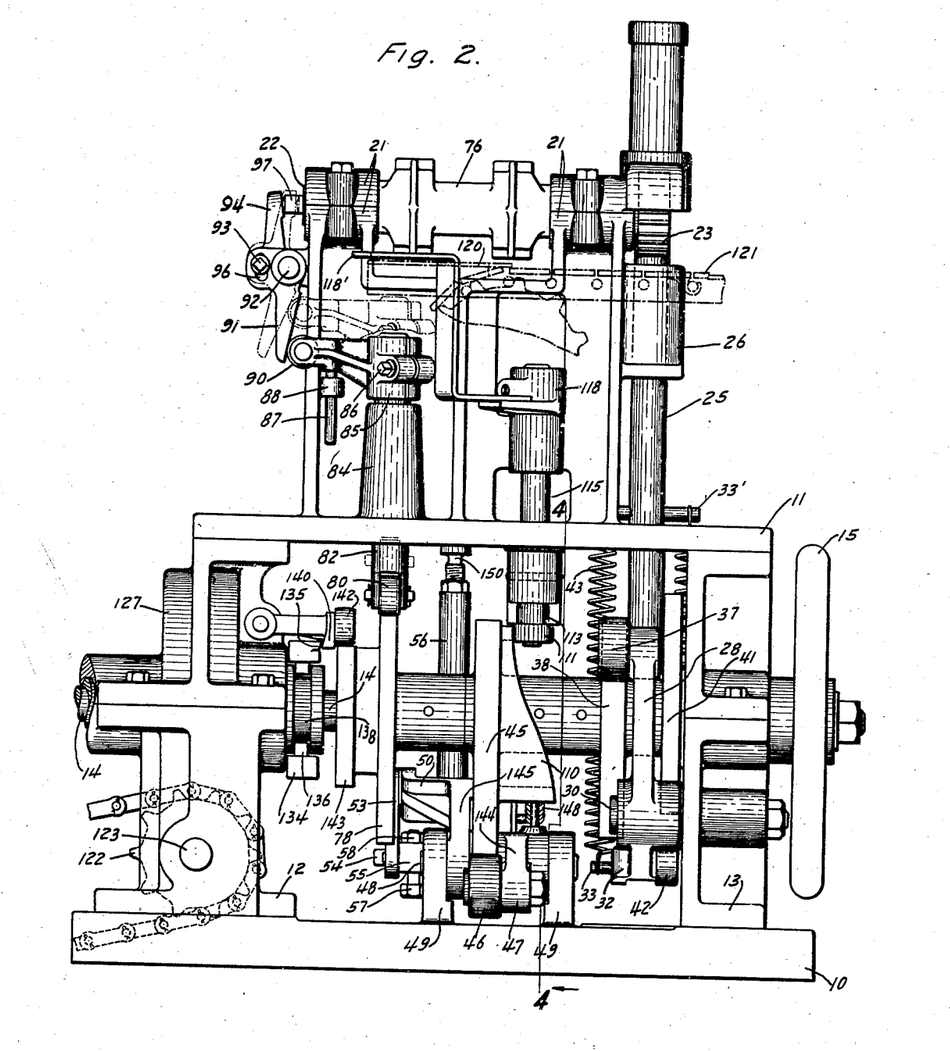
Fig. 2 is a side elevation of the transferring device.
Figure 3:
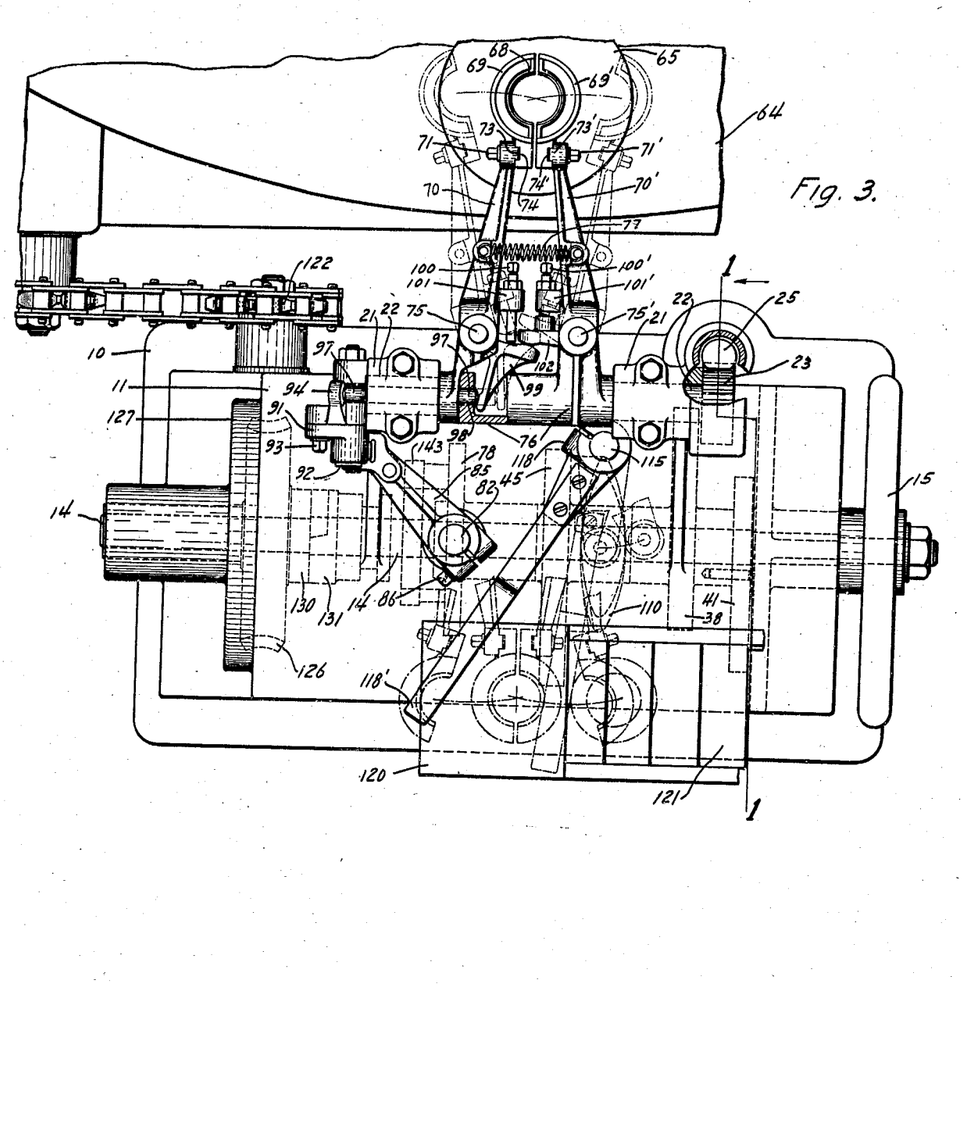
Fig. 3 is a plan view.

These ware holders consist of a pair of jaws 69 and 69' which are removably attached to arms 70 and 70' respectively, by bolts 71 and 71', which are adjustable in slots 72', in the arms, permitting the jaws to be adjusted up or down to suit the mold being used or for alignment with one another. The removable connection permits the use of jaws of various sizes and shapes, thus adapting the ware holders for use in handling various kinds of ware, the ends of the arms being provided with tongues 73 and 73', and the ends of the jaws with grooves 74 and 74' to insure proper alignment of the jaws. The arms are pivoted at 75 and 75', respectively, in enlargements 76 of the shaft 22, and are normally held closed by springs 77 and 77' on arms 70 and 70', but are opened at the desired time by a holder opening cam 78 and its associated mechanism, the cam being keyed on shaft 14 and bearing against a roller 80, in the lower forked end of a vertical rod 82, which is housed in suitable bearings 84, and has on its upper end a split arm 85, clamped thereon by a bolt 86 to permit its adjustment to various heights, and thus impart more or less movement to arm 91. The opposite end of arm 85 is guided in its vertical movements by a rod 87 sliding in a fixed bearing 88 on the frame of the machine. A roller 90, on split arm 85, transmits motion to levers 91, 94, mounted on a stud 92, and connected for angular adjustment by a bolt 93 passing through a slot 96 in lever 91, thus either alone or in conjunction with the adjustment of arm 85, imparting more or less opening movement to the ware holding jaws 69, 69'. The arm 94 bears against rod 97 which is movable longitudinally in an opening 98 through the left end of shaft 22 and its enlargement 76. (Figs. 2 and 3). At its inner end rod 97 bears against one arm of an elbow lever 99 which is pivoted at 75, and the other end of which abuts against a bolt 100 in a projecting lug 101, on arm 70, and also against an arm 102 pivoted at 75'. Arm 102 bears against a bolt 100' corresponding to bolt 100, and carried in a lug 101' corresponding to lug 101. The pressure of lever 99 against bolt 100 and lever 102 and that of the latter against bolt 100', swing arms 70 and 70' outwardly, thus opening the ware holders to receive and discharge the ware A. The further rotation of cam 78 permits arm 85 to decend, releasing lever 91, rod 97 and lever 99, and permitting springs 77 and 77' to close the jaws 69 and 69' and hold the article while it is being swung to its opposite or delivering position (at left of Fig. 1). The ware holders are then opened by the next rise of cam 78, allowing the article to be deposited on receiving plate 120, the cam being so shaped as to raise the arm 85 twice for each rotation of cam shaft 14 to open the ware holders both at their receiving and delivering positions, although it is within the purview of this invention to use such a cam as will open the ware holders at their delivering position and keep them open until they return to their receiving position, thus opening and closing them only once for each article delivered. The bolts 100 and 100' are adjustable to regulate the positioning of the jaws further to the right or left for proper alignment with the mold, and also to adjust the distance the jaws are separated, when in their closed position. The latter result may also be accomplished by adjusting the position of the bolt 93 in the slot 96 although this adjustment is primarily for convenience in assembling.

The ware is pushed from the receiving plate 120 onto a suitable conveyor 121 by action of a wiper cam 110, which may be integral with push up cam 45 and bears against a roller 111 on an arm 113, carried by shaft 115 in a bearing 117, the shaft also carrying a split arm 118 and its wiper arm 118'. When using an open cam 110 as here shown the roller may be held against the cam by any suitable spring. Although the ware is herein described as being deposited onto a receiving plate, it may be deposited directly onto a conveyor if preferred.

The machine is operated automatically by transmitting power from an independent outside source, or from the associated forming machine, to a sprocket wheel 122 on a shaft 123, journaled in bracket 12. Also mounted on shaft 123 is a worm 125 meshing with a worm wheel 126, loosely mounted on shaft 14, and carrying a fixed clutch collar 130 fast to wheel 126 and adapted to be engaged by a sliding clutch collar 131 on shaft 14. The worm wheel 126 has a suitable cover 127 which also serves as a removable top portion of bracket 12. For throwing 130 and 131 into engagement, there is provided a manually operated lever 132, pivoted at 133 to bracket 12, its short end having a fork 134 with an overhang 135 on its upper side and carrying shoes 136 which engage a groove 138 in sliding collar 131.

To prevent disengaging the clutch collars, except at a predetermined period in the operation of the machine, a latch 140, pivotally mounted in cover 127, carries a roller 142 held in engagement, by gravity or other means, with a clutch latch cam 143 which may be formed integral with holder opening cam 78. When the smaller part of cam 143 is uppermost, latch 140 will drop down and engage under the overhang 135, thereby holding the clutch 130, 131 in driving position until the latch is lifted by the larger portion of cam 143. To prevent interference with the forming machine, this period is arranged so the take-out can be thrown out of automatic operation only when the ware holders are adjacent the delivering position, and thereafter the take-out may be operated manually, as for trial and adjustment, by hand wheel 15.

To prevent damage to the transfer apparatus in case push rod 56 encounters any unusual resistance in ejecting an article from a mold, the composite lever 47 comprises two lever members 144 and 145 (Fig. 4), pivotally mounted on stud 48 and normally secured together by a spring pressed detent 146, which is mounted in lever member 144 and engages a slot in an arm 147 projecting from lever member 145. If push rod 56 encounters any unusual resistance, the depression of the left end of lever member 144 by cam 45 will raise its right end, thus pressing detent 146 against its spring and permitting lever members 144 and 145 to be separated temporarily owing to the inability of the latter to move upwardly. When cam 45 releases lever member 144, a spring 148, attached to lugs projecting from the lever members, will again bring them together, permitting detent 146 to engage the slot in arm 147. As soon as the lever members 144 and 145 are thus separated, the rod 56 will drop until the stop screws 57 strike the bearing 59. These screws are so adjusted that the next downward movement of the member 144 will cause the detent 146 to re-engage the slot in the arm 147 and thus re-establish the operating connection to the push rod. This construction provides an overload release which renders the ejector mechanism inoperative for the rest of its cycle, if it encounters any obstruction.

The push rod may occasionally stick in its up position on account of the accumulation of broken glass, or other causes, necessitating the yielding of some part of the mechanism on the subsequent rotation of mold table 64. To provide for this contingency, push rod extension 61 which is preferably made of brittle metal, has a reduced neck 150 of a sufficiently small cross-section to insure the breaking off of this comparatively inexpensive part by the table movement instead of merely bending it and jamming the machine or breaking something more vital should sticking occur. When this happens, it is a simple matter to unscrew the remainder of the extension 61 and substitute a new one therefor.

The normal operation of my invention is as follows:

Clutch collars 130 and 131 being out of engagement and motion being imparted to worm wheel 126, carrying clutch collar 130, the latter will rotate freely on cam shaft 14, and the take-out apparatus may be adjusted by turning hand wheel 15, after which it may be connected with the automatic driving mechanism by moving lever 132. This throws clutch collar 131, which is splined to cam shaft 14, into engagement with rotating clutch collar 130, and rotates turnover cams 38 and 41, push up cam 45, holder opening cam 78, wiper cam 110 and clutch latch cam 143. Push up cam 45 will actuate lever 47, and cause push rod 56 to eject an article A from a mold 65 to the desired height from which it may be received by the ware holders 68. Simultaneously holder opening cam 78 raises split arm 85, which opens the ware holders 68 as previously described. At the same time, cam 41, aided by springs 43, will lower reciprocating rod 25, and, through engagement of its rack 24 with gear 23, swing the ware holders 68, through an arc of approximately 180 degrees, and stop them so they will surround the article that is being ejected from the mold. On the further rotation of cam shaft 14, push up cam 45 will release lever 47, allowing push rod 56 to descend; cam 78 will release lever 99 allowing springs 77 and 77′ to close the ware holders 68 around the article and the latter will be swung to the delivering position by cam 38. At the end of this operation, cam 78 will open the jaws 69 and 69′ as heretofore explained and the article will be deposited on the receiving plate 120. At the same time the wiper cam 110 will cause the wiper arm 118′ to move the article from the receiving plate onto conveyor 121. The further rotation of cam shaft 14 will return wiper arm 118′ to its former position, will rotate cam 78 sufficiently to permit closing the jaws, and will cause the parts to repeat these operations.

The machine is thrown out of automatic operation by pulling on lever 132, until the clutch latch 140 permits motion of the fork 134, thus disengaging the clutch collars 130 and 131.

Figure 10:
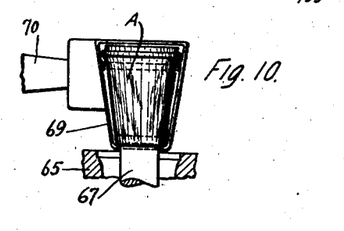
Fig. 10 is a detail view showing a finished article being received by a modified form of jaw.

Any desired form of jaws suitable for grasping or otherwise handling any form of ware may be employed. The shape of the jaws disclosed in Figures 1 and 10 forms no part of the present invention, this subject matter being shown and claimed in Patent No. 1,547,146, granted July 21, 1925, on the application of Karl E. Peiler.

I claim:

1. The combination with a glass shaping machine, of a take-out, means for operating the machine and the take-out in timed relation, means for stopping the take-out independently of the shaping machine, and means to prevent such stoppage of the take-out during a part of its cycle of operation.

2. The combination with a glass shaping machine, of a take-out, a clutch operable to connect and disconnect the machine and the take-out, and a control device to predetermine the time of operation of the clutch.

3. The combination with a glass shaping machine, of a take-out, means for actuating the take-out to remove ware from the shaping machine, means for stopping the operation of the take-out, and means to prevent the stopping means from acting when the take-out is in receiving relation with said machine.

4. The combination with a glass shaping machine, of a take-out, means for actuating the take-out to remove ware from the shaping machine, means for stopping the operation of the take-out, a latch to prevent actuation of the stopping means, and means for periodically moving the latch into and out of effective position in timed relation to the movement of the take-out.

5. Apparatus for removing ware from the molds of a glass shaping machine, comprising a ware holder, means for moving the holder toward and from the molds, means for stopping the movement of the holder independently of the shaping machine, and a controlling device for said stopping means to render the same operative only when the holders are away from the mold.

6. The combination with a glass shaping machine and a continuously traveling conveyor, of a take-out, means for actuating the take-out to remove ware from the shaping machine and to deposit it in the vicinity of the conveyor, a stationary receiving plate adjacent to the conveyor upon which the ware is deposited by the take-out, and means for sliding the ware from the plate onto the conveyor.

7. Apparatus for removing ware from the molds of a glass shaping machine, comprising a ware holder, a ware receiving plate, means for actuating the holder to take ware from the vicinity of the molds and to place it in inverted position on the receiving plate, a continuously moving conveyor, and means operating in timed relation to the movements of the holder for moving the ware from the plate to the conveyor.

8. Apparatus for removing ware from the molds of a glass shaping machine provided with a movable carrier for the molds having an opening, comprising a member reciprocating below the opening, and a replaceable extension on the member, said extension being more easily breakable than the member, whereby any breakage will occur in the replaceable extension.

9. Apparatus for removing ware from the molds of a glass shaping machine provided with a movable carrier for the molds having an opening, comprising a ware lifting member, means for moving said member into and out of said opening in predetermined timed relation to the movements of the carrier, and means for predetermining the location of any breakage of said lifting member caused by failure of said carrier and said lifting member to move in predetermined timed relation.

10. Apparatus for removing ware from the molds of a glass shaping machine provided with a movable mold carrier having an opening, comprising a push rod, means for actuating the carrier and the push rod so as to move the push rod into and out of said opening when the carrier is stationary, and a reduced portion in said rod adapted to break if the carrier should be moved while the rod is in the opening.

11. Apparatus for removing ware from the molds of a glass shaping machine, comprising a mold having a bottom opening, an ejector movable through the opening, actuating means associated therewith, and means rendered operative by an overload on the ejector for rendering the ejector and its actuating means inactive.

12. Apparatus for removing ware from the molds of a glass shaping machine, comprising a mold having a bottom opening, an ejector movable through the opening, actuating means associated therewith, means for rendering the ejector and its actuator inactive when the ejector encounters excessive resistance, and means for automatically rendering said parts active when the resistance is removed.

13. Apparatus for removing ware from the molds of a glass shaping machine, comprising a mold having a bottom opening, an ejector movable through the opening, actuating means therefor, and a yielding connection between the ejector and its actuating means.

14. In means for ejecting articles from molds, the combination of a valve, a push rod for actuating the valve, automatic means for actuating said push rod, and means for permitting said push rod to yield in case it encounters any unusual resistance, said means comprising levers connected by a yielding detent.

15. The combination with a glass shaping machine and a continuously traveling conveyor, of a stationary ware receiving plate adjacent the conveyor, a take-out, means for actuating the take-out to transfer ware from the shaping machine onto the receiving plate, and means for pushing the ware from the plate onto the conveyor in the same direction as that in which the conveyor is traveling.

16. The combination with a glass shaping machine and a continuously traveling conveyor, of a receiving plate adjacent the conveyor, means for transferring the ware from the shaping machine onto the plate, and means for pushing the ware from the plate onto the conveyor in the direction in which the conveyor is traveling and at the same speed.

17. The combination with a glass shaping machine and a continuously acting conveyor, of a take-out, means for actuating the take-out to remove ware from the shaping machine and to deposit it at a fixed station adjacent to the conveyor, a ware-receiving plate at said fixed station upon which the ware is deposited by the take-out, and means for sliding the ware from the plate onto the conveyor.

18. The combination with a glass shaping machine and a continuously acting conveyor to remove the ware taken from the machine, of a ware-receiving plate located at a fixed station adjacent to the conveyor, a take-out, means for actuating the take-out to transfer ware from a shaping machine to the receiving plate, and means for pushing the ware from the plate onto the conveyor in the same direction as that in which the conveyor removes the ware.

19. The combination with a glass shaping machine and a continuously acting conveyor to remove the ware taken from the machine, of a receiving plate adjacent to the conveyor, means for transferring the ware from the shaping machine to the plate, and means for pushing the ware from the plate onto the conveyor on the same direction in which the conveyor removes the ware and at substantially the same speed.

20. The combination with a glass shaping machine, of a take-out, means for operating the machine and the take-out in timed relation, means for stopping the take-out independently of the shaping machine, and means for rendering said take-out stopping means inoperative during a part of the cycle of operation of said take-out.

21. The combination with a glass shaping machine, of a take-out clutch operable to connect and disconnect the machine and the take-out, means for operating said clutch, and a control device to predetermine the time in the cycle of the take-out operation at which the clutch-operating means become effective.

22. The combination with a glass shaping machine, of a take-out, means for actuating the take-out to remove ware from the shaping machine, means for stopping the operation of the take-out, and a rigid obstructing member to positively prevent the stopping means from acting when the take-out is in receiving relation with the machine.

23. Apparatus for removing ware from the molds of a glass-shaping machine, comprising a ware holder, means for moving the holder towards and from the molds, means for stopping the holder independently of the shaping machine, and a controlling device movable into and out of operative position relative to said stopping means for rendering the same operative only when the holders are away from the molds.

24. In a glass machine, a movable support, a plurality of molds mounted on said support and brought in turn into the take-out position by the movement of said support, take-out means adapted to grasp the ware when elevated in said molds, a kick-up pin in the bottom of each of said molds, means oscillating on a horizontal axis at the take-out position and adapted to elevate said kick-up pins, and means whereby when a kick-up pin abnormally resists elevation said oscillating means are rendered inoperative.

Signed at Waterville N. H., this 30th day of August 1920.

EDWARD H. LORENZ.